US010435953B2

(12) United States Patent
Delaunay et al.

(10) Patent No.: US 10,435,953 B2
(45) Date of Patent: Oct. 8, 2019

(54) TERMINATION BULKHEADS FOR SUBSEA PIPE-IN-PIPE SYSTEMS

(71) Applicant: Acergy France SAS, Suresnes (FR)

(72) Inventors: Nathalie Delaunay, Saint Germain en Laye (FR); Gerald Gerometta, Paris (FR)

(73) Assignee: Acergy France SAS, Suresnes (FR)

( * ) Notice: Subject to any disclaimer, the term of this patent is extended or adjusted under 35 U.S.C. 154(b) by 28 days.

(21) Appl. No.: 15/547,762

(22) PCT Filed: Jan. 27, 2016

(86) PCT No.: PCT/IB2016/000280
§ 371 (c)(1),
(2) Date: Jul. 31, 2017

(87) PCT Pub. No.: WO2016/125024
PCT Pub. Date: Aug. 11, 2016

(65) Prior Publication Data
US 2018/0087327 A1 Mar. 29, 2018

(30) Foreign Application Priority Data
Feb. 3, 2015 (GB) .................................. 1501775.9

(51) Int. Cl.
E21B 17/00 (2006.01)
F16L 9/18 (2006.01)
(Continued)

(52) U.S. Cl.
CPC .......... *E21B 17/003* (2013.01); *E21B 36/003* (2013.01); *E21B 36/005* (2013.01);
(Continued)

(58) Field of Classification Search
CPC .... E21B 17/003; E21B 43/013; E21B 36/005; E21B 36/003; E21B 43/01; E21B 36/04; F17D 1/18; F17D 3/01
See application file for complete search history.

(56) References Cited

U.S. PATENT DOCUMENTS 2,720,267 A * 10/1955 Brown ................ E21B 33/1265
166/119
3,665,154 A 5/1972 Ando
(Continued)

FOREIGN PATENT DOCUMENTS

EP 2 009 338 12/2008
EP 2 546 630 7/2012
(Continued)

OTHER PUBLICATIONS

PI Specification 5L, "Specification for Line Pipe," American Petroleum Institute, Dec. 2012 (45th ed.).
(Continued)

*Primary Examiner* — David J Bagnell
*Assistant Examiner* — Manuel C Portocarrero
(74) *Attorney, Agent, or Firm* — Levy & Grandinetti

(57) ABSTRACT

A pipe-in-pipe bulkhead assembly has inner and outer rings spaced in concentric relation to define a thermally-isolating gap in the annulus between them. Interlocking formations project into the annulus from each of the rings, presenting confronting faces where they overlap radially. The gap extends between the longitudinally-spaced faces. A thermally-insulating spacer is interposed between the faces in the gap to carry axial mechanical loads between the inner and outer rings. Heating elements outside the inner ring extend longitudinally beyond the gap between the faces and along a longitudinal passageway that passes through or beside an interlocking formation of the inner ring. The spacer may be positioned before or after the outer ring is
(Continued)

placed, for example as a discrete element or as an injected mass. An additional sealing mass may also be positioned in the annulus, for example by injection, to promote a gas-tight seal.

36 Claims, 6 Drawing Sheets

(51) Int. Cl.
*F16L 7/00* (2006.01)
*F16L 59/065* (2006.01)
*F16L 1/12* (2006.01)
*F16L 1/16* (2006.01)
*F17D 1/18* (2006.01)
*E21B 36/04* (2006.01)
*E21B 43/01* (2006.01)
*H05B 3/42* (2006.01)
*F16L 53/38* (2018.01)
*F16L 53/30* (2018.01)
*E21B 36/00* (2006.01)
*E21B 43/013* (2006.01)
*F16L 7/02* (2006.01)
*F17D 3/01* (2006.01)
*F16L 9/19* (2006.01)

(52) U.S. Cl.
CPC .............. *E21B 36/04* (2013.01); *E21B 43/01* (2013.01); *E21B 43/013* (2013.01); *F16L 1/123* (2013.01); *F16L 1/16* (2013.01); *F16L 7/00* (2013.01); *F16L 7/02* (2013.01); *F16L 9/18* (2013.01); *F16L 9/20* (2013.01); *F16L 53/30* (2018.01); *F16L 53/38* (2018.01); *F16L 59/065* (2013.01); *F17D 1/18* (2013.01); *F17D 3/01* (2013.01); *H05B 3/42* (2013.01); *F16L 9/19* (2013.01); *H05B 2214/03* (2013.01)

(56) References Cited

U.S. PATENT DOCUMENTS

| | | | | |
|---|---|---|---|---|
| 3,786,878 | A * | 1/1974 | Chapman | E21B 17/18 175/106 |
| 4,560,188 | A | 12/1985 | Berti et al. | |
| 5,259,651 | A | 11/1993 | Sharp | |
| 6,279,654 | B1 * | 8/2001 | Mosing | E21B 21/01 166/177.4 |
| 2003/0178842 | A1 * | 9/2003 | Gallagher | E21B 17/00 285/123.15 |
| 2004/0245768 | A1 | 12/2004 | Giacomelli et al. | |
| 2005/0212285 | A1 | 9/2005 | Haun | |
| 2009/0272541 | A1 * | 11/2009 | Nutley | E21B 17/10 166/378 |

FOREIGN PATENT DOCUMENTS

| | | | |
|---|---|---|---|
| GB | 2 161 565 | 1/1986 | |
| GB | 2492883 | 1/2013 | |
| GB | 2493545 | 2/2013 | |
| GB | 2493545 A * | 2/2013 | ................ F16L 1/19 |
| WO | WO 02/12773 | 2/2002 | |
| WO | WO 02/16732 | 2/2002 | |
| WO | WO 03/033955 | 4/2003 | |
| WO | WO 2009/083937 | 7/2009 | |
| WO | WO 2014/029644 | 2/2014 | |

OTHER PUBLICATIONS

API Recommended Practice 1111, Design, Construction, Operation, and Maintenance of Offshore Hydrocarbon Pipelines (Limit State Design), Sep. 2015 (5th ed.).

* cited by examiner

TERMINATION BULKHEADS FOR SUBSEA PIPE-IN-PIPE SYSTEMS

This invention relates to rigid steel pipelines of pipe-in-pipe ('PiP') construction, suitable for subsea applications. More specifically, the invention relates to termination bulkheads for connecting an elongate PiP structure such as a pipeline, preferably an electrically trace-heated PiP pipeline, to an intermediate structure or an end structure.

Subsea pipelines are used in oil and gas production as 'tie-ins' to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the production fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form.

The challenges of thermal management increase as subsea pipelines become longer. In this respect, there is a trend toward longer tie-ins as oil and gas reserves are being exploited in increasingly challenging locations.

Designers of subsea pipelines have adopted both passive and active approaches to thermal management, either individually or in combination.

In passive thermal management systems, the pipeline is thermally insulated. One example of a passive system is a PiP structure comprising a fluid-carrying inner pipe positioned concentrically within an outer pipe. The inner and outer pipes are spaced from each other to define an insulating annulus between them. Typically, insulating material is disposed in the annulus; it is also possible to draw down a partial vacuum in the annulus to reduce transmission of heat through the annulus.

PiP structures provide high-performance thermal insulation by virtue of the annulus. Their double-walled construction also enhances mechanical strength and leak protection.

In active thermal management systems, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732.

Electrically trace-heated PiP (ETHP) employs a combination of passive and active thermal management measures to manage the temperature of production fluids particularly effectively. GB 2492883 and WO 2014/029644 disclose typical electrically trace-heated PiP flowline sections. A further example of electrically trace-heated PiP is shown in FIG. 1 of the drawings.

In a length of electrically trace-heated PiP as shown in FIG. 1, low-voltage electric heating elements 10 such as copper wires are disposed around an inner pipe 12 of a PiP assembly 14. Thus, the heating elements 10 lie within the annulus 16 defined between the inner pipe 12 and an outer pipe 18 of the PiP assembly 14. In this example, the heating elements 10 extend longitudinally along the PiP assembly 14 in parallel to its central longitudinal axis, although the heating elements 10 could instead be twisted helically around the inner pipe 12 or arranged in a wave pattern—known in the art as an S-Z layout—along the inner pipe 12. One or more other longitudinally-extending elements 20 such as data cables or power cables may be positioned beside and between the heating elements 10. The annulus 16 may also contain an insulating layer 22 that overlays the heating elements 12 and other elements 20 as shown. Again, air may be evacuated from the annulus 16.

Although not shown in FIG. 1, electrical power is suitably provided to the heating elements 10 by subsea electrical cables that are connected to the electrically trace-heated PiP system underwater via wet-mateable electrical connectors. Another approach is to splice an end of the heating elements 10 to a subsea electrical cable above the surface, aboard an installation vessel.

Whatever thermal management system is employed, it is important to maintain thermal management continuously along the length of a pipeline. Otherwise, 'cold spots' will arise, which increase the likelihood of plugs forming at those locations.

It is straightforward to maintain continuous thermal management along a continuously tubular pipe length comprising pipe joints or pipe stalks welded end-to-end. It is more challenging to maintain continuous thermal management where tubular pipe lengths of a pipeline are interrupted by structures or accessories, such as those that define a branch or termination.

Accessories may be placed at the ends of a pipeline, where they are known as pipeline end terminations (PLETs) or flowline end terminations (FLETs). Other accessories may be positioned in-line between the ends of a pipeline, such as in-line tees (ILTs). Such accessories may be assembled into a pipeline during offshore pipe-laying to be laid on the seabed as part of the pipeline. In that case, the accessory is suitably welded to one or more adjoining pipe lengths on a pipelaying vessel that fabricates and launches the pipeline.

It is desirable for an electrically trace-heated PiP system to be continuous both electrically and in terms of thermal efficiency from the beginning to the end of a flowline, along the principal fluid conduits of all intervening structures.

PiP pipelines may be fabricated offshore on, and laid from, a pipelaying vessel using J-lay or S-lay techniques. In those techniques, PiP pipe joints are welded successively at field joints to an upper end of a pipe string extending as a catenary toward the seabed from a hang-off mechanism or tensioner of the vessel. The welds are tested and the field joints are coated before each new section of the pipe string is launched into the sea. Accessories are incorporated into the pipeline between pipe joints at appropriate intervals and are launched with the pipe string into the sea.

PiP pipelines may also be laid in reel-lay operations, in which the pipeline is prefabricated at a coastal spoolbase that a reel-lay vessel visits for loading. At the spoolbase, the pipeline is spooled onto a reel carried by the vessel. During subsequent pipelaying at sea, the pipeline is unspooled from the reel and straightened. Accessories are incorporated into the pipeline at appropriate intervals during laying by cutting through an unspooled length of the pipeline while supporting the catenary in a hang-off mechanism below the cut, separating the cut pipe ends, placing an accessory in the resulting gap between the cut ends and welding the cut ends to the accessory. Once incorporated into the pipeline, tension in the catenary is transferred from the hang-off mechanism below the accessory to a tensioner above the accessory. Thus supported, the accessory is launched with the adjoining lengths of pipeline into the sea. Once closed, the annulus of a PiP pipeline can be evacuated on a vessel offshore. However, if possible, the annulus of a PiP pipeline is evacuated during an onshore pre-fabricate process as this removes that operation from the critical path during subsequent offshore operations.

A single-wall pipeline can be connected to a structure such as an accessory or to another pipeline by a conventional connector. Such a connector allows the pipeline to be coupled to the accessory or uncoupled from the accessory at will. However, conventional connectors are not suitable for PiP pipelines because such connectors can only fluidly connect the inner pipe. They cannot manage connection of the outer pipe to bear loads; nor can they close the annulus to maintain low pressure if required.

A strong mechanical connection is required between the inner and outer pipes of PiP pipelines. This is because the outer pipe must bear longitudinal loads including the weight of the inner pipe as the pipe string hangs from a hang-off mechanism or tensioner. In this respect, it will be clear that the inner pipe cannot be engaged directly with a hang-off mechanism or gripped by a tensioner. Instead, the weight load of the inner pipe is transmitted to the outer pipe through longitudinally-spaced connections between them. Those connections must also withstand differential thermal expansion of the inner and outer pipes in use as the inner pipe is exposed to hot production fluids and the outer pipe is exposed to cold seawater.

For these reasons, an end connection of a length of PiP pipeline takes the form of a bulkhead that connects the inner and outer pipes and optionally seals the annulus. The bulkhead connects two pipe lengths together or connects one pipe length to a structure such as an accessory. Thus, the bulkhead is welded to a pipe length on one side and to another pipe length or to a structure on the other side.

The bulkhead can be in one piece or made of multiple pieces fixed together. Its main purpose is to transfer mechanical loads between the inner and outer pipes during installation and in operation of a pipeline. Its secondary purpose is, optionally, to seal an end of the annulus.

Y- and H-section bulkheads are known in the prior art, for example as disclosed in GB 2161565 and U.S. Pat. No. 4,560,188 respectively. Bulkheads also allow a PiP pipeline to be spooled for reel-lay. However, specific design provisions may be necessary for a reel-lay PiP pipeline, as disclosed in WO 03/033955 for example, so that the outer diameter is approximately constant and the bulkhead can arrest buckle propagation.

Conventional bulkheads such as those mentioned above suffer from thermal bridging through the steel bulkhead wall that spans the annulus between the inner and the outer pipes, thus generating cold spots. These cold spots cannot be mitigated by active thermal management because there is no provision for heating elements to extend continuously through or across such bulkheads.

US 2005/0212285 also describes a bulkhead that generates cold spots due to thermal bridging through the bulkhead wall. There is no suggestion in US 2005/0212285 of active thermal management of the pipeline and so there is no provision for heating elements.

WO 02/12773 describes a PiP assembly with coupling formations at its ends that enable a pipeline to be assembled from a series of such assemblies without welding offshore. The inner and outer pipes of the assembly have radially-projecting, longitudinally-spaced annular projections that together define radially-overlapping opposed confronting surfaces. The confronting surfaces are connected mechanically by a solid ring of a rigid thermally insulating material, such as nylon, sandwiched between the projections. The insulating ring decouples the inner and outer pipes thermally but transmits axial loads between the inner and outer pipes axially via the projections, which compress the ring between them when under axial load. The insulating ring also acts transversely as a spacer between the inner and outer pipes.

Whilst the insulating ring arrangement described in WO 02/12773 helps to eliminate cold spots, it also precludes active thermal management of a pipeline because there is no provision for heating elements to extend continuously along the full length of the pipeline. In addition, the ring will merely lie loosely against one or both of the confronting surfaces unless it is under compression during transient axial load. Consequently, the ring cannot ensure sufficient leak-tightness to maintain the low pressure of a partial vacuum in the annulus.

WO 2009/083937 describes a joining piece for connecting between the inner and outer pipes at the end of a section of PiP pipeline. This allows a pipe length to be manufactured offshore from a number of such pipe sections welded together.

In a remote technical field, U.S. Pat. No. 5,259,651 discloses double-wall T-fittings for use with double-wall pipelines, as part of leak-resistant systems for delivering hazardous liquids such as flammable fuels through underground pipework. As there is no requirement for thermal management to retain heat in such liquids, there is no suggestion in U.S. Pat. No. 5,259,651 that the leak-resistant double-wall arrangement may be insulative. Also, of course, there is no suggestion in U.S. Pat. No. 5,259,651 of adding heating elements to pipework that is intended to carry flammable volatile liquids.

In U.S. Pat. No. 5,259,651, a compression spacer of plastics material is inserted into the annulus between inner and outer pipes but is incapable of transmitting large loads between those pipes, particularly axial loads. Indeed, the double-wall pipes themselves cannot bear large loads as they are made of extruded plastics material. Also, the spacer cannot serve as a sealing bulkhead because it is outwardly grooved to allow fluid communication between the annulus and the corresponding space between the inner and outer walls of the fitting. So, even if the skilled person consulted U.S. Pat. No. 5,259,651, which is unlikely given the remoteness of its field, its teaching would be useless for solving the problems addressed by the present invention.

Against this background, the invention resides in a pipe-in-pipe bulkhead assembly, comprising inner and outer rings in spaced concentric relation to define an annulus between them that provides a thermally-isolating gap between the rings. The annulus contains: at least one interlocking formation projecting into the annulus from each of the rings, which interlocking formations overlap radially to present confronting faces to each other that are spaced longitudinally such that the gap extends between the faces; and a thermally-insulating spacer interposed between the faces in the gap. In accordance with the invention, at least one heating element extending along the annulus outside the inner ring extends longitudinally beyond the spacing between the faces and along a longitudinal passageway that passes through or beside at least one interlocking formation projecting into the annulus from the inner ring.

The or each heating element is preferably radially inboard of the gap between the confronting faces and hence is radially inboard of the spacer positioned in that gap, The or each heating element may therefore extend along a longitudinal passageway between the spacer and an external surface of the inner ring. For example, a radially inward side of the spacer may be shaped to define one or more longitudinal passageways to accommodate the or each heating element.

The spacer preferably comprises longitudinally-opposed facing surfaces shaped to seat against the confronting faces of the interlocking formations.

In some embodiments of the invention, the spacer is a pre-shaped element that is inserted into the gap between the faces when making the assembly. For ease of assembly, such a spacer may be assembled from part-circumferential spacer components. In other embodiments, the spacer is formed in situ in the gap between the faces when making the assembly. For example, the spacer may be injected into the gap and/or moulded in the gap and around at least one of the interlocking formations. Similarly, the spacer may be formed in situ around the or each heating element.

At least one layer of thermal insulation is preferably provided around the inner ring. The or each layer of thermal insulation may extend to, through, or beside the or each interlocking formation that projects into the annulus from the inner ring. In that case, the spacer may be radially outboard of the or each layer of thermal insulation. In another approach, the or each layer of thermal insulation is spaced from the or each interlocking formation that projects into the annulus from the inner ring, hence exposing an external surface portion of the inner ring to the annulus. In that case, the spacer may abut the exposed external surface portion of the inner ring.

Advantageously, the spacer seals to the confronting faces of the interlocking formations with a gas-tight seal. The spacer may also seal with a gas-tight seal to an exposed external surface of the inner ring and to an exposed internal surface of the outer ring. To aid effective sealing, at least sealing surface portions of the spacer are preferably resiliency flexible.

The bulkhead assembly of the invention may further comprise a sealing mass in the annulus effecting a gas-tight seal with: the spacer; at least one of the interlocking formations; an exposed external surface of the inner ring; an exposed internal surface of the outer ring; or the or each heating element. Like the spacer, the sealing mass may be formed in situ in the annulus, for example by being injected into and/or moulded in the annulus.

For ease of forging, the confronting faces of the interlocking formations are preferably inclined relative to a plane that is orthogonal to a central longitudinal axis of the assembly, each face extending radially inwardly toward that axis moving in the same direction along that axis.

There may be at least two opposed pairs of confronting faces to provide a bi-directional mechanical effect along a longitudinal axis of the bulkhead assembly.

At least one interlocking formation projecting into the annulus from the inner ring is preferably circumferentially discontinuous, for example by being penetrated or bounded by gaps, grooves, holes or other openings spaced circumferentially around the inner ring to accommodate the heating elements.

The inventive concept extends to a PiP pipeline comprising the bulkhead assembly of the invention. That pipeline may include a pipeline accessory welded to the bulkhead assembly.

The inventive concept also embraces a method of making a pipe-in-pipe bulkhead assembly. That method comprises: providing an inner ring having at least one externally-projecting interlocking formation; passing at least one heating element along a longitudinal passageway that passes through or beside the at least one externally-projecting interlocking formation of the inner ring; placing an outer ring, having at least one internally-projecting interlocking formation, in spaced concentric relation around the inner ring to form an annulus that provides a thermally-isolating gap between the rings, in which annulus the interlocking formations overlap radially to present confronting faces to each other that are spaced longitudinally such that the gap extends between the faces; and positioning a thermally-insulating spacer in the gap between the faces, radially outboard of the or each heating element.

The inner ring may be welded onto an end of an inner pipe of a pipe-in-pipe assembly. Similarly, the outer ring may be welded onto an end of an outer pipe of a pipe-in-pipe assembly. The outer ring may be assembled from two or more components such as half-shells.

One or more layers of thermal insulation may be placed around the inner ring, in which case the spacer is suitably positioned radially outboard of the or each layer of thermal insulation.

The spacer may be positioned on the inner ring before placing the outer ring around the inner ring and the spacer. For example, the spacer may be plastically or elastically deformed by placing the outer ring, to conform to the confronting faces of the interlocking formations, to an outer surface of the inner ring and/or to an inner surface of the outer ring. Alternatively, the spacer may be positioned in the gap between the confronting faces after placing the outer ring around the inner ring, for example by injecting and/or moulding the spacer in the gap and around at least one of the interlocking formations.

The bulkhead assembly of the invention effects a mechanical transition between a pipeline structure and an adjoining length of PiP pipeline. It makes a mechanical junction between inner and outer pipes while allowing safe penetration of wires such as heating elements. Preferably, the bulkhead also preserves the vacuum inside a PiP annulus.

The invention involves thermally uncoupling the inner and outer pipe of a PiP structure by providing a gap in a bulkhead assembly. Mechanical coupling across the annulus between the pipes is retained by placing a spacer or buffer material in the gap that can isolate the annulus and withstand mechanical loads, especially axial loads experienced during installation that put the material under compressive stress.

In reel-lay applications, the bulkhead assembly is apt to be manufactured onshore before spooling the pipeline onto a reel. Vacuum can be drawn down inside the annulus between two bulkhead assemblies. Offshore, on a pipe laying vessel, a structure such as a pipeline accessory is welded to an end of the bulkhead assembly. Once welded into place, the structure can ensure resistance to axial mechanical loads.

In summary, the invention provides a termination bulkhead assembly for a PiP pipeline. In some embodiments, the assembly comprises an inner bulkhead ring that is weldable to an end of an inner pipe string of the pipeline. The inner bulkhead ring comprises at least one external tooth or other interlocking formation projecting radially outwardly. The assembly further comprises an outer bulkhead ring that is weldable to an end of an outer pipe string of the pipeline. The outer bulkhead ring comprises at least one internal tooth or other interlocking formation projecting radially inwardly. The internal interlocking formation of the outer bulkhead ring is able to engage the external interlocking formation of the inner bulkhead ring to transfer longitudinal axial loads between the inner and outer bulkhead rings in at least one axial direction.

A mechanical junction material is inserted, injected and/or moulded as a spacer inside the annulus between the inner bulkhead ring and the outer bulkhead ring, When injected and/or moulded, that mechanical junction material spreads longitudinally around the interlocking formations and fills the annulus radially, so that at least a gap between the internal interlocking formation of the outer bulkhead ring and the external interlocking formation of the inner bulkhead ring is filled with mechanical junction material.

The annulus may also contain at least one layer of thermal insulating material wrapped around the outside of the inner bulkhead ring. Such a layer of thermal insulating material may extend to, embrace or otherwise encompass the tooth or other outwardly-projecting interlocking formation of the inner bulkhead ring.

The mechanical junction material is preferably thermally insulative and is suitably at least partially resilient to promote sealing contact for air-tightness. A specific example of a mechanical junction material is a polymer such as polyimide, although the choice of the polymer is a trade-off between its capacity for thermal insulation and its resistance to compression or crushing. Advantageously, the mechanical junction material is capable of interfacing with steel components of the bulkhead assembly and any thermal insulating layer of the bulkhead assembly in an air-tight manner.

The outwardly-projecting interlocking formation of the inner bulkhead ring may be circumferentially discontinuous, for example by comprising at least one bore to receive a cable, such as an electrical heating cable used for heating, an electrical power cable for carrying power or an electrical or optical cable for carrying data.

At least the outer ring is suitably made of two or more pieces, for example at least two half-shells. The outer ring may also comprise at least one bore for injecting the mechanical junction material.

To allow spooling for reel-lay operations, the bulkhead assembly can preferably withstand a bending strain of up to 2% without sustaining permanent damage.

Provided that there is leak-tightness to a partial vacuum, the bulkhead can be assembled onshore and reeled.

The invention is particularly concerned with rigid pipelines. In this respect, it is important to understand that the terms 'rigid' and 'flexible' as applied to pipes have clear meanings in the subsea oil and gas industry that differ in important respects from general language. For example, nominally 'rigid' pipes have enough flexibility to be bent if a minimum bend radius is observed. Yet, such pipes are not regarded in the industry as being 'flexible'.

Rigid pipes used in the subsea oil and gas industry are specified in API Specification 5 L and Recommended Practice 1111. In contrast to flexible pipes, a rigid pipe usually consists of or comprises at least one pipe of solid steel or steel alloy. However, additional elements can be added, such as an internal liner layer or an outer coating layer. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the minimum bend radius of rigid pipe used in the subsea oil and gas industry is typically around 100 to 300 meters depending upon the cross-sectional dimensions of the pipe. However, slight plastic deformation can be recovered or rectified by mechanical means, such as straightening. Thus, during reel-lay installation of a rigid pipeline made up of welded rigid pipe joints, the rigid pipeline can be spooled on a reel with a typical radius of between 8 and 10 meters. This implies a bending strain above 2% for conventional diameters of rigid pipes, requiring the pipeline to be straightened mechanically upon unspooling.

Reference has already been made to FIG. 1 of the appended drawings, which is a cut-away perspective view of a length of electrically trace-heated PiP pipeline known in the prior art. In order that the invention may be more readily understood, reference will now be made, by way of example, to the remaining drawings in which.

Figure 1:
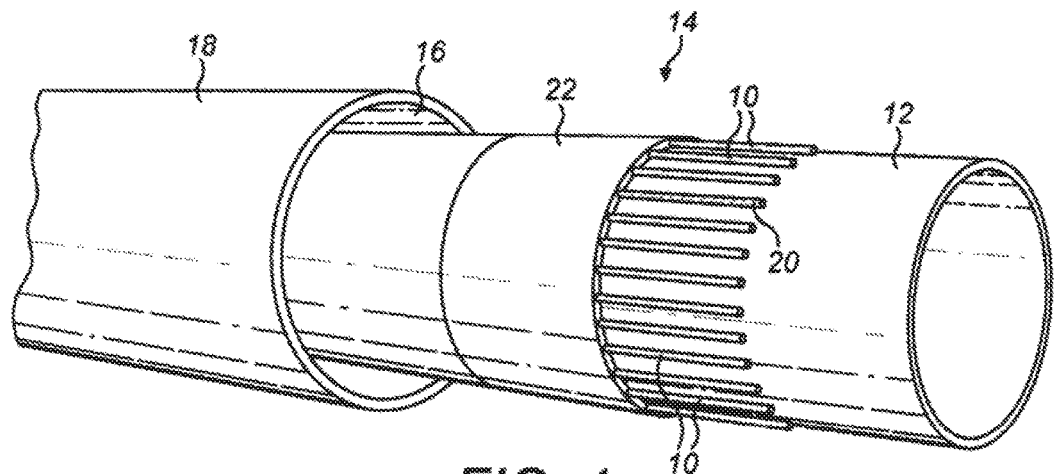

In FIGS. 2 to 12, like numerals are used for like parts. Thus, in FIGS. 2 and 3 of the drawings, a PiP bulkhead assembly 24 of the invention comprises an inner pipe 12 and an outer pipe 18 defining an annulus 16 in the space between them. Electric heating elements are embedded in an insulating layer 22 laid on the outer side of the inner pipe 12 in the annulus 16. The electric heating elements are concealed and so are not visible in FIGS. 2 and 3 but they are visible in FIGS. 7 to 10.

In practice, bulkhead assemblies of the invention will usually be embodied by inner and outer concentric forgings welded in series with the inner and outer pipes 12, 18 respectively. Once welded into position, those forgings become integrated with the inner and outer pipes 12, 18 as an extension of the pipe walls. Such forgings are shown separately in FIGS. 7 to 12 but for ease of illustration, FIGS. 2 and 3 simply show the inner and outer pipes 12, 18 extending continuously through the bulkhead assembly 24 and hence incorporating the forgings.

The bulkhead assembly 24 comprises circumferential interlocking projections 26, 28 in the annulus 16. Specifically, an inner projection 26 projects radially outwardly into the annulus 16 from the inner pipe 12 toward the outer pipe 18; and a longitudinally-opposed outer projection 28 projects radially inwardly into the annulus 16 from the outer pipe 18 toward the inner pipe 12.

In longitudinal section as shown, the inner and outer projections 26, 28 are generally wedge-shaped, each comprising an inclined shoulder 30 and an oppositely-tapered back surface 32. The shoulders 30 and the back surfaces 32 each extend from the associated pipe 12, 18 to respective ends of a longitudinally-extending land 34 at the apex of each projection 26, 28. Radiused junctions lie between the shoulders 30 and the respective pipes 12, 18. The inclination of the shoulders 30 and the taper of the back surfaces 32 suits the projections for manufacture by forging.

The projections 26, 28 project far enough into the annulus 16 in their respective radial directions that there is an interlocking radial overlap between their shoulders 30, which therefore define confronting faces of the projections 26, 28. Thus, the radially outermost land 34 of the inner projection 26 lies on a greater circumference than the radially innermost land 34 of the outer projection 28. In other words, the radially outermost land 34 of the inner projection 26 is radially outboard of the radially innermost land 34 of the outer projection 28.

To give clearance for their interlocking overlap, the shoulders 30 of the projections 26, 28 are spaced longitudinally from each other along the common central longitudinal axis 36 of the concentric pipes 12, 18. As the inner and outer projections 26, 28 lie in mutually-opposed orientations, the radially-overlapping shoulders 30 of the projections 26, 28 confront each other across an insulating gap that isolates the projections 26, 28, and thus the pipes 12, 18, from each other thermally.

To make a mechanical connection between the inner and outer pipes 12, 18, the gap between the shoulders 30 is filled by an insulating buffer or spacer ring 38 that is sandwiched between the shoulders 30. In that position, the spacer ring 38 transmits axial forces between the projections 26, 28 and thus between the pipes 12, 18 and maintains the radial spacing between the pipes 12, 18. The spacer ring 38 will be described later with reference to FIGS. 4 to 6 of the drawings.

When the pipes 12, 18 are in an upright orientation during laying, the shoulder 30 of the inner projection 26 lies above the shoulder 30 of the outer projection 28. Thus, having regard to the lay direction, the outer projection 28 is downstream of the inner projection 26. The result is that the interlocking overlap between the shoulders 30 of the projections 26, 28 compresses the spacer ring 38 to prevent the inner pipe 12 dropping within the outer pipe 18 during laying. Compression of the spacer ring 38 also blocks relative longitudinal movement between the pipes 12, 18 in operation, as may be driven by differential thermal expansion.

The shoulders 30 of the projections 26, 28 are inclined at similar angles to the respective pipes 12, 18 and so are generally parallel to each other in longitudinal section as shown. The shoulders 30 are inclined steeply relative to the respective pipes 12, 18 and extend radially inwardly in the lay direction, that being the direction in which the pipes 12, 18 will be laid. The back surfaces 32 of the projections 26, 28 are inclined at a much shallower angle relative to the respective pipes 12, 18 in the opposite direction relative to the shoulders 30.

Neither projection 26, 28 extends across the full radial depth of the annulus 16. Thus, the radially outermost apex of the inner projection 26 is spaced from the inside of the outer pipe 18 and the radially innermost apex of the outer projection 28 is spaced from the outside of the inner pipe 12.

The outer projection 28 may be continuous around the full circumference of the annulus 16 or may be interrupted circumferentially. The inner projection 26 is not wholly continuous around the full circumference of the annulus 16, being interrupted or penetrated by gaps, grooves or holes to accommodate longitudinal heating elements laid on the outside of the inner pipe 12. Indeed, the inner projection 26 may be interrupted circumferentially to the extent that it comprises a circumferential array of teeth spaced angularly around the central longitudinal axis 36.

Figure 2:
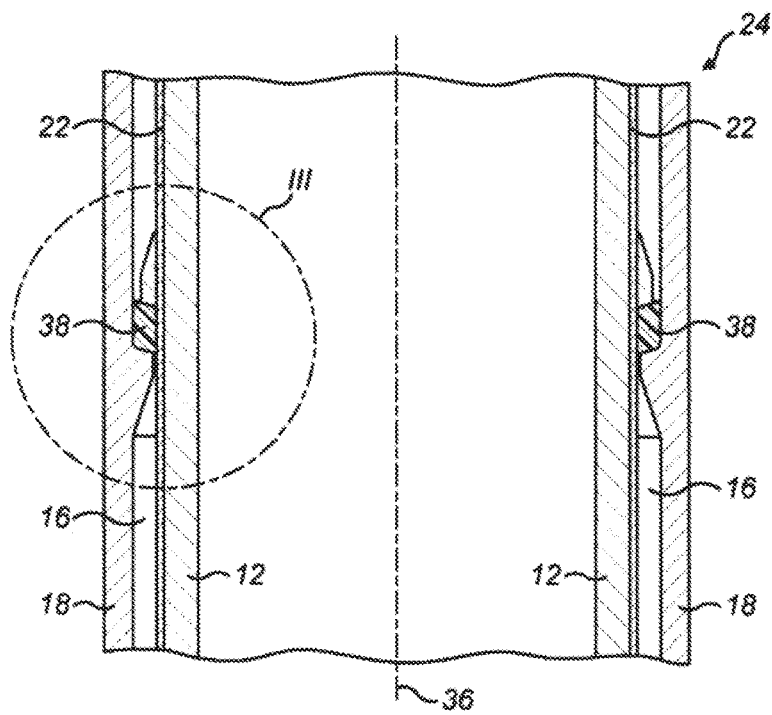
FIG. 2 is a schematic sectional view of a bulkhead assembly in accordance with the invention.
Figure 3:
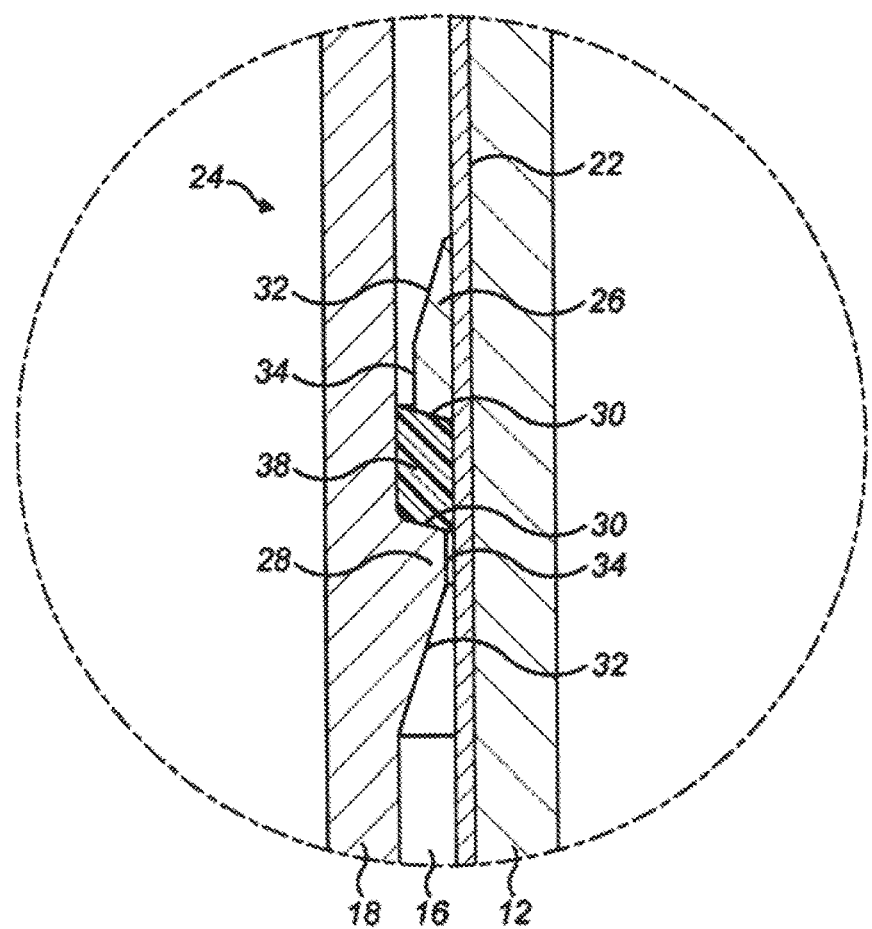
FIG. 3 is an enlarged schematic sectional view of the bulkhead assembly of the invention, corresponding to Detail III of FIG. 2.

The longitudinal openings or passageways through the inner projection 26 defined by the gaps, grooves or holes allow heating elements in the annulus 16 around the inner pipe 12 to extend continuously along a pipeline through the bulkhead assembly 24. In particular, there is no need for additional electrical connections or to interrupt thermal management. It will be noted that FIGS. 2 and 3 show the insulating layer 22, in which heating elements are embedded as noted above, extending continuously through the bulkhead assembly 24.

Figure 4:
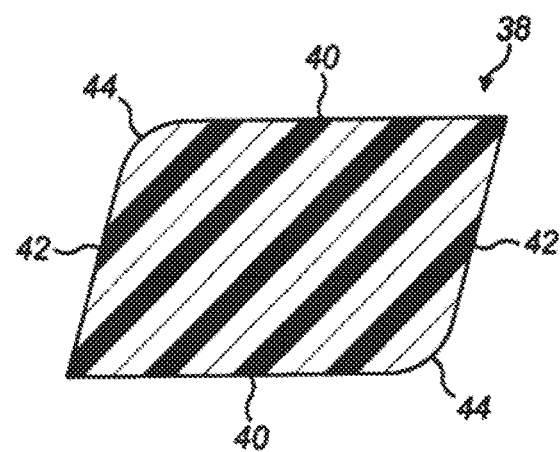
FIG. 4 shows the cross-section of an insulating spacer ring used in the bulkhead assembly of the invention shown in FIGS. 1 and 2.
Figure 5:
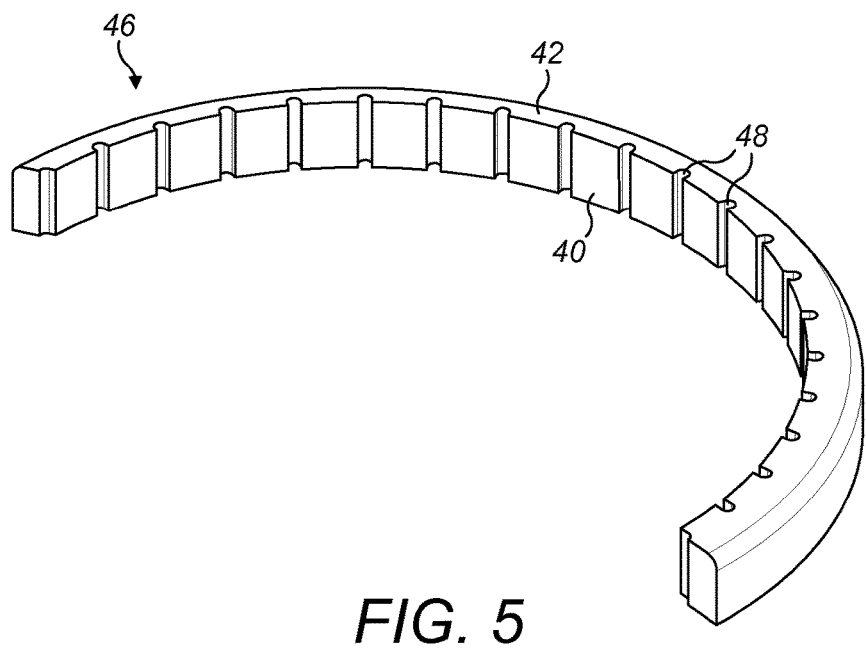
FIG. 5 is a perspective view of a portion of the insulating spacer ring shown in FIG. 4.
Figure 6:
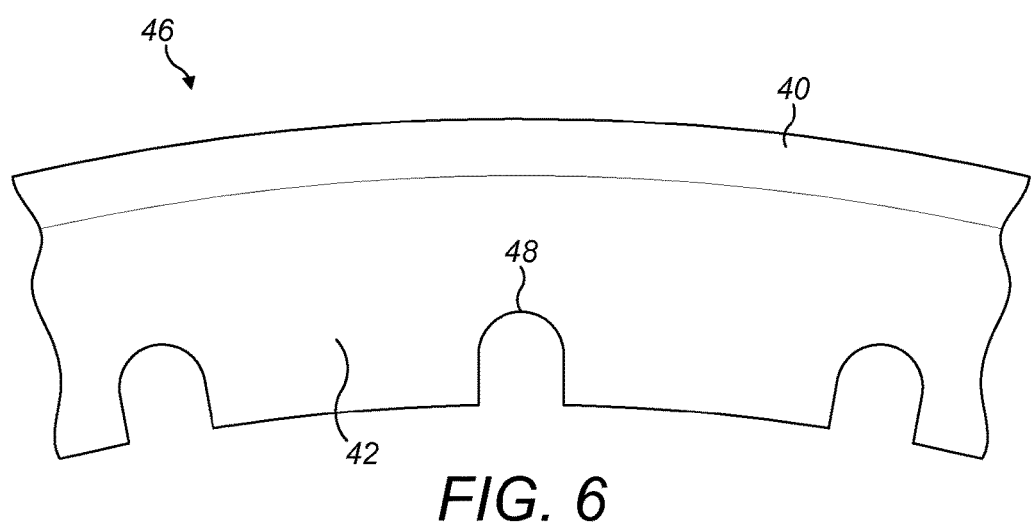
FIG. 6 is an enlarged detail view of the insulating spacer ring portion shown in FIG. 5.

Moving on now to FIGS. 4, 5 and 6, these drawings show the insulating spacer ring 38 in more detail. The spacer ring 38 is suitably moulded or sintered of a plastics material such as polyimide.

FIG. 4 shows that the cross-section of the spacer ring 38 approximates to a rhomboid, with two pairs of generally parallel sides. Paired first sides 40 are spaced from each other to seat against the outside of the inner pipe 12 and the inside of the outer pipe 18. Paired second sides 42 are inclined relative to the first sides 40 to match the inclination of the shoulders 30 of the inner and outer projections 26, 28. Diagonally-opposed radiused corners 44 between each first side 40 and one of the second sides 42 allow the spacer ring 38 to seat snugly into the similarly radiused junctions between the shoulders 30 and the respective pipes 12, 18.

FIG. 5 shows a semi-circular portion 46 of the spacer ring 38, intended to be assembled with a similar portion 46 around the inner pipe 12 to form the full-circumference spacer ring 38. It will be apparent here that an inner first side 40 of the ring portion 46 has a circumferential array of channels 48 extending through the ring portion 46 between the second sides 42. Thus, the channels 48 extend longitudinally through the ring portion 46 when the spacer ring 38 is positioned in the bulkhead assembly 24 as shown in FIGS. 1 and 2.

In this example, each channel 48 has an arched cross-section that is best appreciated in the enlarged detail view of FIG. 6. The channels 48 are shaped and dimensioned to accommodate typical electric heating elements used in electrically trace-heated PiP systems, preferably without the heating elements touching the sides of the channels 48.

FIGS. 7 to 11 show other bulkhead assemblies in accordance with the invention. Again, like numerals are used for like parts. In each of these examples, an inner forging 50 and an outer forging 52 comprise inner and outer rings 54, 56 respectively in concentric relation. In this instance, the inner and outer projections 26, 28 are integral with the rings 54, 56 of the forgings 50, 52 respectively. The rings 54, 56 of the forgings 50, 52 attach to ends of inner and outer pipes 12, 18 respectively. The annulus 16 between the pipes 12, 18 also extends between the rings 54, 56 of the forgings 50, 52.

The forgings 50, 52 are shown in FIGS. 7 to 10 attached by butt welds 58 at one end of the rings 54, 56 to ends of the inner and outer pipes 12, 18 respectively. The other ends of the rings 54, 56 are shown in FIGS. 7 to 10 ready for welding to an intermediate or termination structure such as a pipeline accessory, or to an adjoining pipe length. The forgings 50, 52 are shown in FIG. 11 ready for welding to adjoining pipe lengths.

Figure 7:
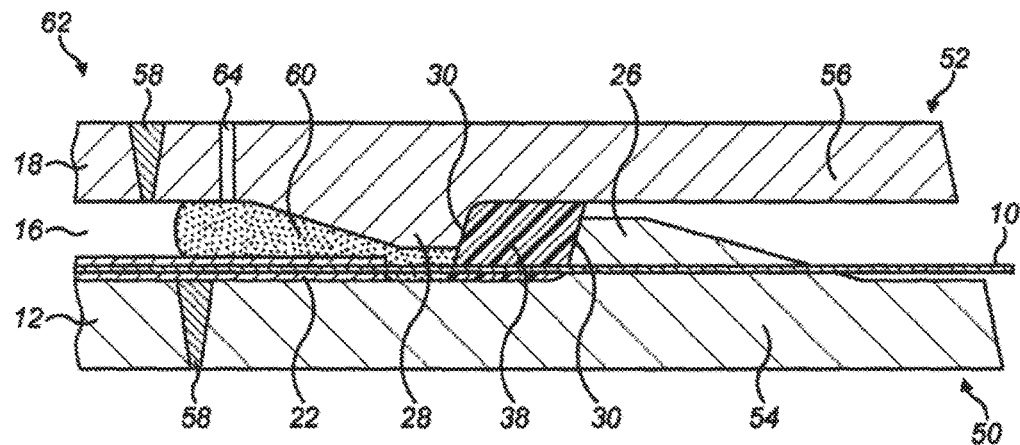
FIGS. 7 to 11 are schematic sectional views of other bulkhead assemblies in accordance with the invention.
Figure 8:
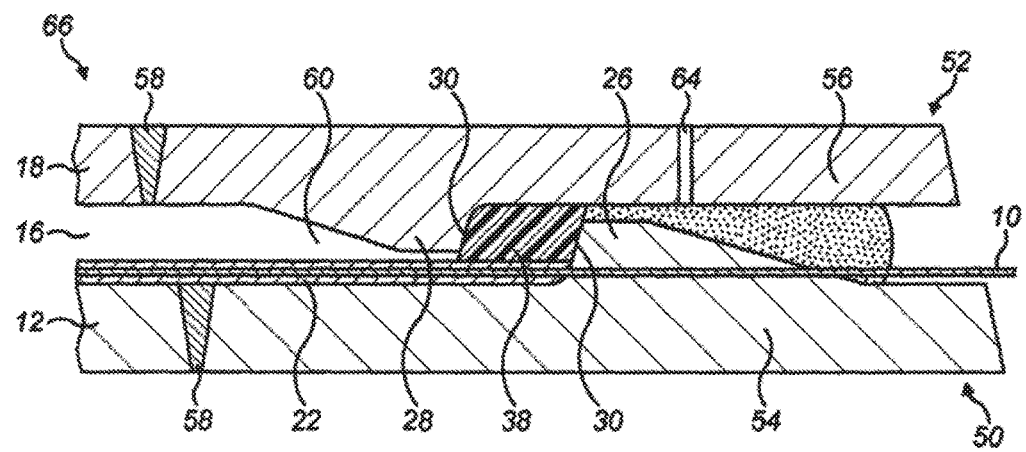

The embodiments shown in FIGS. 7 and 8 adapt the arrangement shown in FIGS. 2 and 3 by the addition of an injected polymer 60 that is injected into the annulus 16 as a sealing mass to conform with and seal against the features in the annulus 16. This separates the functions of mechanical resistance and sealing. The injected polymer 60 is suitably of a thermoset material such as polyimide, which also has insulating qualities to avoid thermal bridging across the annulus 16.

In the bulkhead assembly 62 shown in FIG. 7, the injected polymer 60 has been injected through a port 64 that penetrates a wall of the outer ring 56 at a position downstream of the insulating spacer ring 38 in the lay direction. Thus, FIG. 7 shows the sealing mass of injected polymer 60 sealed against the downstream side of the insulating spacer ring 38 and around the heating elements 10. In this example, the insulating layer 22 has been cut back from the insulating spacer ring 38 to leave a gap between the end of the insulating layer 22 and the insulating spacer ring 38 where the inner ring 54 is exposed. There, the injected polymer 60 seals against the exposed surface of the inner ring 54 and surrounds and embeds the heating elements 10, thus creating a gas-tight seal at an end of the annulus 16.

In the bulkhead assembly 66 shown in FIG. 8, the injected polymer 60 has been injected through a port 64 that penetrates a wall of the outer ring 56 at a position upstream of the insulating spacer ring 38 in the lay direction. Thus, FIG. 8 shows the sealing mass of injected polymer 60 sealed against the upstream side of the insulating spacer ring 38 and around the heating elements 10 exposed on the upstream side of the inner projection 26. There, the inner ring 54 is exposed so that the injected polymer 60 seals against the exposed surface of the inner ring 54 in addition to surrounding and embedding the heating elements 10. Again, this creates a gas-tight seal at an end of the annulus 16.

Once enough polymer 60 has been injected into the annulus 16, the ports 64 in the wall of the outer ring 56 may be closed by welding or by inserting a threaded or welded plug.

Figure 9:
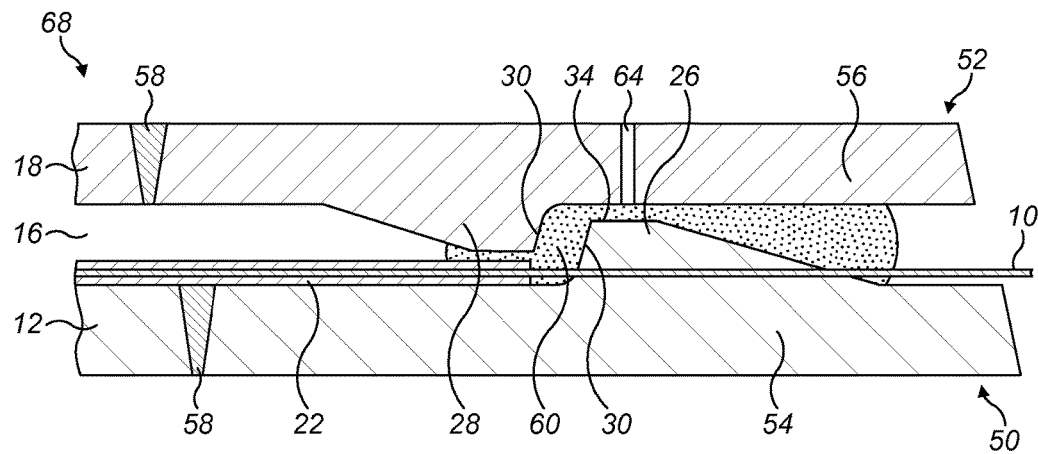
Figure 10:
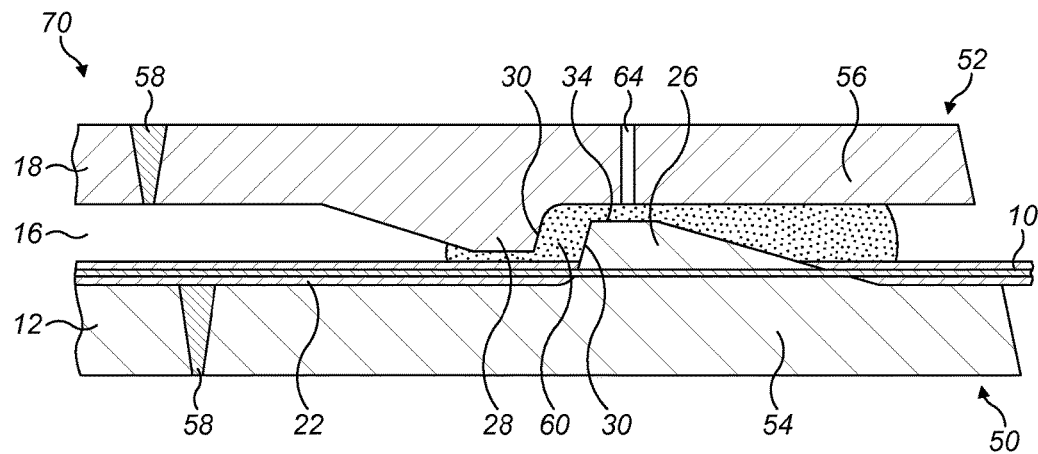
Figure 11:
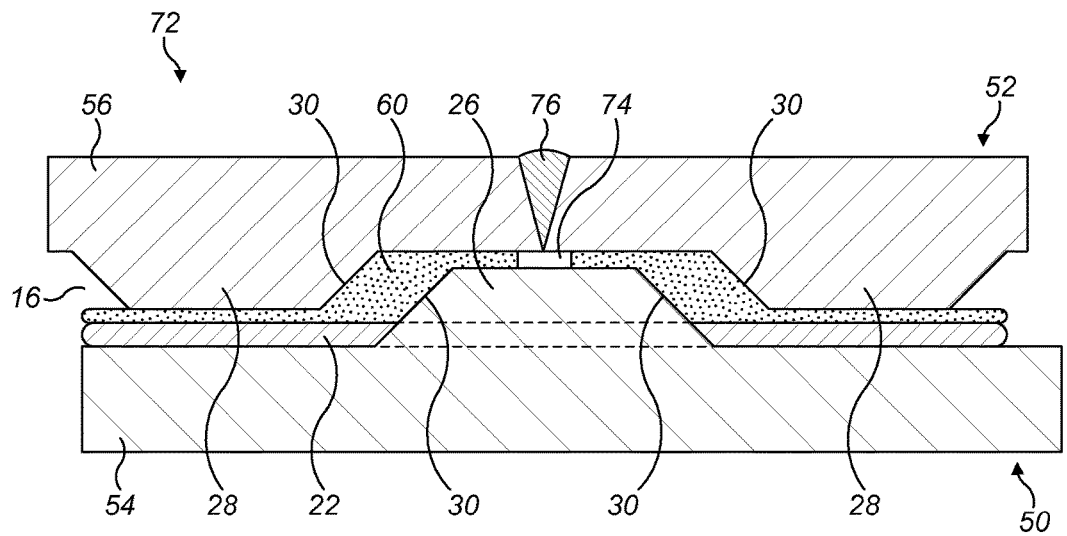

The embodiments shown in FIGS. 9, 10 and 11 use an injected insulating polymer 60 as a spacer or buffer to effect mechanical coupling between the confronting shoulders 30 of the projections 26, 28 while isolating them thermally. Consequently, the insulating spacer ring 38 of the preceding embodiments is redundant and so has been omitted. Optionally, the injected polymer 60 also seals the annulus 16. In these embodiments, the gap between the shoulders 30 is suitably reduced in comparison with the corresponding gap where there is an insulating spacer ring 38 as in FIGS. 2 and 3.

The polymer 60 is injected through a port 64 that penetrates a wall of the outer ring 56 at a position opposite the land 34 of the inner projection 26. The injected polymer 60 flows upstream and downstream of the inner projection 26 with reference to the lay direction, hence filling the gap between the confronting shoulders 30 of the projections 26, 28.

In the bulkhead assembly 68 shown in FIG. 9, the insulating layer 22 has been cut back from the inner projection 26 to leave a gap between the end of the insulating layer 22 and the inner projection 26 where the inner ring 54 is exposed. There, the mass of injected polymer 60 seals against the exposed surface of the inner ring 54 and surrounds and embeds the heating elements 10, thus creating a gas-tight seal at an end of the annulus 16. The mass of injected polymer 60 also seals around the heating elements 10 where they are exposed on the upstream side of the inner projection 26 with respect to the lay direction. There, the inner pipe 12 is also exposed so that the injected polymer 60 seals against the exposed surface of the inner ring 54 in addition to surrounding and embedding the heating elements 10.

In the bulkhead assembly 70 shown in FIG. 10, the insulating layer 22 abuts the shoulder 30 and the inclined back surface 32 of the inner projection 26. The mass of injected polymer 60 lies against the insulating layer 22 on the radially outer side of that layer 22.

The bulkhead assembly 72 shown in FIG. 11 is generally symmetrical about a central transverse plane that is orthogonal to the central longitudinal axis of the assembly 72 and that bisects the inner projection 26. Thus, in this example, the inner projection 26 has two inclined shoulders 30 facing away from each other in opposite longitudinal directions, one shoulder 30 extending between each end of the land 34 and the inner ring 54. Similarly, there are two outer projections 28 longitudinally outboard of the inner projection 26, presenting respective inclined shoulders 30 facing toward each other in opposite longitudinal directions. Each shoulder 30 of the outer projections 28 confronts a respective shoulder 30 of the inner projection 26 with interlocking radial overlap.

An insulating layer 22 in the annulus 16 on the outside the inner ring 54 extends through a longitudinal gap in the inner projection 26 between teeth or other circumferentially discontinuous elements of the inner projection 26. Electric heating elements embedded in the insulating layer 22 are concealed and so are not visible in FIG. 11.

A mass of injected polymer 60 lies against the insulating layer 22 on the radially outer side of that layer 22, hence acting as a spacer to fill the gaps between the confronting shoulders 30 of the inner projection 26 and the outer projections 28. A gap 74 in the injected polymer 60 provides for a weld 76 to be made between longitudinally-abutting sections of the outer ring 56.

The symmetrical features of the bulkhead assembly 72 have a bi-directional effect longitudinally. The radial interlock between the two pairs of shoulders 30 resists relative movement between the inner and outer rings 54, 56 and hence between the inner and outer pipes 12, 18 in either longitudinal direction.

Figure 12:
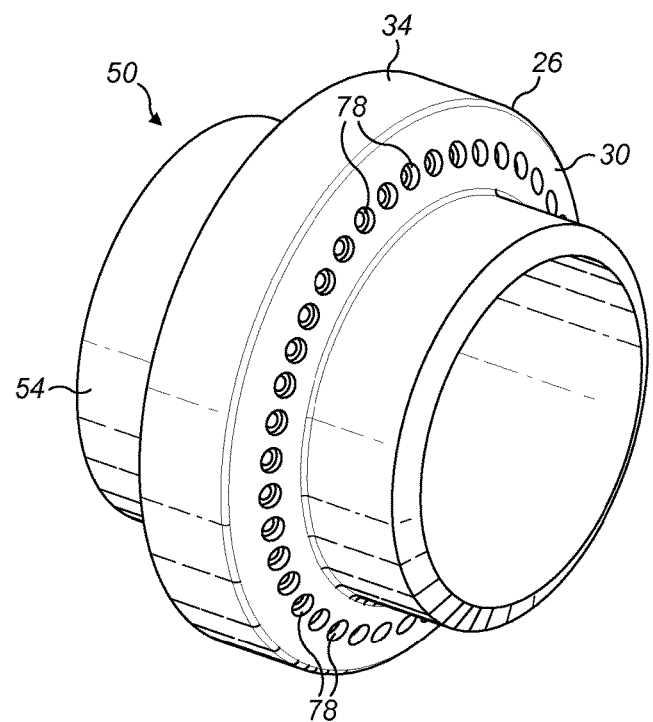
FIG. 12 is a perspective view of an inner bulkhead forging suitable for use in bulkhead assemblies of the invention.

Turning finally to FIG. 12 of the drawings, this shows an inner forging 50 comprising an inner ring 54 and an inner projection 26. A frusto-conical shoulder 30 and an apical land 34 of the inner projection 26 are evident, as is a circumferential array of through-holes 78 extending through the inner projection 26 from the shoulder 30 to accommodate electrical heating elements of an electrically trace-heated PiP assembly.

An advantage of using the polymer 60 to seal the annulus 16 is that it removes the need for penetrators, which are fragile and expensive parts known in the prior art to provide an interface between cables and holes provided for the cables in surrounding metal structures. In addition, when the pipeline is bent as during spooling onto a reel, the bulkhead assembly will ovalise slightly in cross-section. The polymer 60 can comply with such deformation whereas penetrators may not ensure sufficient leak-tightness because each hole containing a penetrator will also ovalise locally.

Various assembly methods can be used to make bulkhead assemblies of the invention. One example starts with sliding an outer pipe string relative to an inner pipe string so that the inner pipe string protrudes from the outer pipe string. Then, the following operations can be performed, albeit that not all of these operations must necessarily take place in the following order:

- welding an inner ring comprising at least one outer tooth or other interlocking projection to the inner pipe string;
- passing at least one cable mounted on the outer surface of the inner pipe string through provisions in a tooth or other projection of the inner ring or between teeth or other projections of the inner ring;
- wrapping a layer of thermal insulation material around the inner ring;
- injecting a layer of mechanical junction material around the layer of thermal insulation material;
- assembling an outer ring comprising an inner tooth or other interlocking projection around the layer of mechanical junction material;
- welding two or more part-shells of the outer ring together; and
- welding the outer ring to the outer pipe string.

Other variations are possible within the inventive concept. For example, the spacer may have one or more relatively flexible and resilient surface portions to aid sealing against abutting surfaces. The spacer may also have a relatively stiff core to transmit loads effectively between the inner and outer pipes, especially axial loads between the interlocking formations.

The spacer or sealing mass could be an initially soft, pliable element that cures by hardening. The spacer or sealing mass may be plastically or elastically deformed by the act of placing the outer ring around the inner ring. Such deformation can conform the spacer or sealing mass to the confronting faces of the interlocking formations, to an outer surface of the inner ring and/or to an inner surface of the outer ring.

Thus, it is possible for a spacer or sealing mass to be shaped or moulded in place within the annulus rather than injected, or to be injected and moulded in combination. A flowable polymer material may be poured through a port in the outer ring in a casting process rather than being injected under pressure. Mould plates may be inserted into the annulus to define the boundary of the moulded part. In another approach that obviates a port, flowable polymer material can be injected, poured and/or moulded through the annulus if the annulus is accessible, for example via an injection pipe running inside the annulus leading to an injection nozzle.

To resist torsional forces that could otherwise shear the heating elements, key stopper formations may be added to the spacer ring and the inner ring or inner pipe of the bulkhead assembly. Such formations will prevent the spacer ring turning around the central longitudinal axis of the assembly, relative to the inner ring or inner pipe.

The invention claimed is:

1. A pipe-in-pipe bulkhead assembly, comprising inner and outer rings in spaced concentric relation to define an annulus between them that provides a thermally-isolating gap between the rings, which annulus contains:

at least one interlocking formation projecting into the annulus from each of the rings, which interlocking formations overlap radially to present confronting faces to each other that are spaced longitudinally such that the gap extends between the faces; and a thermally-insulating spacer interposed between the faces in the gap;

wherein at least one heating element extending along the annulus outside the inner ring extends longitudinally beyond the spacing between the faces and along a longitudinal passageway that passes through or circumferentially beside at least one interlocking formation projecting into the annulus from the inner rings; and wherein the assembly further comprises a sealing mass, formed in situ in the annulus, effecting a gas-tight seal with: the spacer; at least one of the interlocking formations; an exposed external surface of the inner ring; an exposed internal surface of the outer ring; or the or each heating element.

2. The assembly of claim 1, wherein the or each heating element extends along a longitudinal passageway between the spacer and an external surface of the inner ring.

3. The assembly of claim 2, wherein a radially inward side of the spacer is shaped to define one or more longitudinal passageways to accommodate the or each heating element.

4. The assembly of claim 1, wherein the spacer comprises longitudinally-opposed facing surfaces shaped to seat against the confronting faces of the interlocking formations.

5. The assembly of claim 1, wherein the spacer is a pre-shaped element inserted into the gap between the faces when making the assembly.

6. The assembly of claim 5, wherein the spacer is assembled from part-circumferential spacer components.

7. The assembly of claim 1, wherein the spacer is formed in situ in the gap between the faces when making the assembly.

8. The assembly of claim 7, wherein the spacer Is injected and/or moulded into the gap and around at least one of the interlocking formations.

9. The assembly of claim 7, wherein the spacer is formed in situ around the or each heating element.

10. The assembly of claim 1, further comprising at least one layer of thermal insulation around the inner ring.

11. The assembly of claim 10, wherein the layer of thermal insulation extends to the or each interlocking formation projecting into the annulus from the inner ring.

12. The assembly of claim 11, wherein the layer of thermal insulation extends through or beside an interlocking formation projecting into the annulus from the inner ring.

13. The assembly of claim 10, wherein the spacer is radially outboard of the layer of thermal insulation.

14. The assembly of claim 10, wherein the layer of thermal insulation is spaced from the or each interlocking formation projecting into the annulus from the inner ring, exposing an external surface portion of the inner ring to the annulus.

15. The assembly of claim 14, wherein the spacer abuts the exposed external surface portion of the inner ring.

16. The assembly of claim 1, wherein the spacer seals to the confronting faces of the Interlocking formations with a gas-tight seal.

17. The assembly of claim 16, wherein the spacer also seals with a gas-tight seal to an exposed external surface of the inner ring and an exposed internal surface of the outer ring.

18. The assembly of claim 1, wherein at least sealing surface portions of the spacer are resilient.

19. The assembly of claim 1, wherein the sealing mass is injected into and/or moulded in the annulus.

20. The assembly of claim 1, wherein the confronting faces of the interlocking formations are inclined relative to a plane that is orthogonal to a central longitudinal axis of the assembly, each face extending radially inwardly toward that axis moving in the same direction along that axis.

21. The assembly of claim 1, further comprising at least two opposed pairs of confronting faces.

22. The assembly of claim 1, wherein at least one interlocking formation projecting into the annulus from the inner ring is circumferentially discontinuous.

23. The assembly of claim 22, wherein the or each interlocking formation is penetrated or bounded by gaps, grooves, holes or other openings spaced circumferentially around the inner ring.

24. A pipe-in-pipe pipeline comprising the bulkhead assembly of claim 1.

25. The pipeline of claim 24, comprising a pipeline accessory welded to the bulkhead assembly.

26. A method of making a pipe-in-pipe bulkhead assembly, comprising:
   providing an inner ring having at least one externally-projecting interlocking formation;
   passing at least one heating element along a longitudinal passageway that passes through or circumferentially beside the at least one externally-projecting interlocking formation of the inner ring;
   placing an outer ring, having at least one internally-projecting interlocking formation, in spaced concentric relation around the inner ring to form an annulus that provides a thermally-isolating gap between the rings, in which annulus the interlocking formations overlap radially to present confronting faces to each other that are spaced longitudinally such that the gap extends between the faces;
   positioning a thermally-insulating spacer in the gap between the faces, radially outboard of the or each heating element; and
   forming a sealing mass in situ in the annulus to effect a gas-tight seal in the bulkhead assembly with: the spacer; at least one of the interlocking formations; an exposed external surface of the inner ring; an exposed internal surface of the outer ring; or the or each heating element.

27. The method of claim 26, comprising welding the inner ring onto an end of an inner pipe of a pipe-in-pipe assembly.

28. The method of claim 26, comprising welding the outer ring onto an end of an outer pipe of a pipe-in-pipe assembly.

29. The method of claim 26, comprising assembling the outer ring from two or more components.

30. The method of claim 26, comprising placing one or more layers of thermal insulation around the inner ring.

31. The method of claim 30, comprising positioning the spacer radially outboard of the or each layer of thermal insulation.

32. The method of claim 26, wherein the spacer is positioned on the inner ring before placing the outer ring around the inner ring and the spacer.

33. The method of claim 32, wherein the spacer is plastically or elastically deformed by placing the outer ring, to conform to the confronting faces of the interlocking formations, to an outer surface of the inner ring and/or to an inner surface of the outer ring.

34. The method of claim 26, wherein the spacer is positioned in the gap between the confronting faces after placing the outer ring around the inner ring.

35. The method of claim 34, comprising injecting and/or moulding the spacer in the gap and around at least one of the interlocking formations.

36. The method of claim 26, comprising injecting and/or moulding the sealing mass in the annulus.

\* \* \* \* \*